United States Patent
Rawalkshatriya et al.

(10) Patent No.: US 11,451,523 B2
(45) Date of Patent: Sep. 20, 2022

(54) METHODS AND SYSTEMS FOR SECURE SHARING OF DATA BETWEEN USER DEVICES USING A PROXY RE-ENCRYPTION KEY (PRE)

(71) Applicant: Coracias Advanced Technologies LLC, Dover, DE (US)

(72) Inventors: Bharat Singh Rawalkshatriya, Jenkintown, PA (US); S. Sharmila Deva Selvi, Chennai (IN)

(73) Assignee: NXTKEY CORPORATION, Cheyenne, WY (US)

( * ) Notice: Subject to any disclaimer, the term of this patent is extended or adjusted under 35 U.S.C. 154(b) by 234 days.

(21) Appl. No.: 16/688,642

(22) Filed: Nov. 19, 2019

(65) Prior Publication Data

US 2020/0280547 A1 Sep. 3, 2020

Related U.S. Application Data

(60) Provisional application No. 62/811,927, filed on Feb. 28, 2019.

(51) Int. Cl.
*H04L 9/40* (2022.01)
*H04L 9/08* (2006.01)

(52) U.S. Cl.
CPC ........ *H04L 63/0464* (2013.01); *H04L 9/0825* (2013.01); *H04L 9/0891* (2013.01); *H04L 63/0428* (2013.01); *H04L 63/06* (2013.01)

(58) Field of Classification Search
CPC . H04L 63/0464; H04L 9/0825; H04L 9/0891; H04L 63/0428; H04L 63/06; H04L 2463/062; H04L 9/0822; H04L 63/0478; H04L 9/088; H04L 2209/76
See application file for complete search history.

(56) References Cited

U.S. PATENT DOCUMENTS

| | | | | |
|---|---|---|---|---|
| 2002/0019935 | A1* | 2/2002 | Andrew | H04L 9/0897 713/165 |
| 2013/0322621 | A1* | 12/2013 | Yoon | H04L 9/3066 380/44 |
| 2014/0006773 | A1* | 1/2014 | Chazalet | H04L 63/0464 713/150 |
| 2015/0381588 | A1* | 12/2015 | Huang | H04L 67/1097 713/153 |
| 2016/0119292 | A1* | 4/2016 | Kaseda | H04L 9/14 713/165 |
| 2018/0316495 | A1* | 11/2018 | Wall | G06F 21/606 |

* cited by examiner

Primary Examiner — Henry Tsang
(74) Attorney, Agent, or Firm — Mannava & Kang, P.C.; Vinay Malik

(57) ABSTRACT

Embodiments disclosed herein relate to cryptology, and more particularly to secure sharing of data objects stored in the at least one cloud device between two user devices using the PRE. Embodiments herein disclose methods and systems for enabling a first user device to subscribe with a key server for uploading encrypted data object to at least one cloud device using the PRE. Embodiments herein disclose methods and systems for allowing the first user device to share the encrypted data object stored in the at least one cloud device with a second user through the key server using the PRE.

18 Claims, 13 Drawing Sheets

METHODS AND SYSTEMS FOR SECURE SHARING OF DATA BETWEEN USER DEVICES USING A PROXY RE-ENCRYPTION KEY (PRE)

CROSS REFERENCE TO RELATED APPLICATION

This application is based on and derives the benefit of U.S. Provisional Application 62/811,927 filed on 28 Feb. 2019 the contents of which are incorporated herein by reference.

TECHNICAL FIELD

Embodiments disclosed herein relate to cryptology, and more particularly to secure sharing of data stored in at least one cloud device between user devices using Proxy Re-Encryption (PRE), wherein the PRE does not involve a bilinear paring operation and the PRE is a unidirectional single-use PRE for multiple hops that offers control over the shared secure data.

BACKGROUND

In general, confidentiality of data in application is ensured by a primitive called encryption. Consider an example scenario, wherein $PK_i$ and $PK_j$ are two independent public keys of two users identified as $ID_i$ and $ID_j$. The public key $PK_i$ can be used to encrypt data associated with a user and a private key of another user $SK_j$ can be used to obtain the original data.

Many applications such as, but not limited to, encrypted mail forwarding systems, secure distributed file systems, outsourced filtering of encrypted spam and so on require re-encryption. If a user $ID_i$ and a holder of $SK_i$ (a private key) are on-line, ciphertext ($E_i(m)$) can be re-encrypted. In order to achieve the re-encryption, the ciphertext ($E_i(m)$) can be decrypted with the $SK_i$ and then a message m can be encrypted using the $PK_j$, which results in $E_j(m)$ that can be further decrypted with the $SK_j$. If the user $ID_i$ is not on-line, then the user has to expose the private key $SK_i$ to a third party (a cloud, a key-server and so on) to achieve re-encryption. However, due to the exposure of the private key, the message may available in plain to the third party. Further, the user does not trust the third party in order to expose the private key. In addition, transporting of the private key to a recipient leads to a key sharing problem, if the message/file is encrypted using the private key which is chosen by the user/owner.

BRIEF DESCRIPTION OF THE FIGURES

The embodiments disclosed herein will be better understood from the following detailed description with reference to the drawings, in which.

DETAILED DESCRIPTION OF EMBODIMENTS

Figure 1:
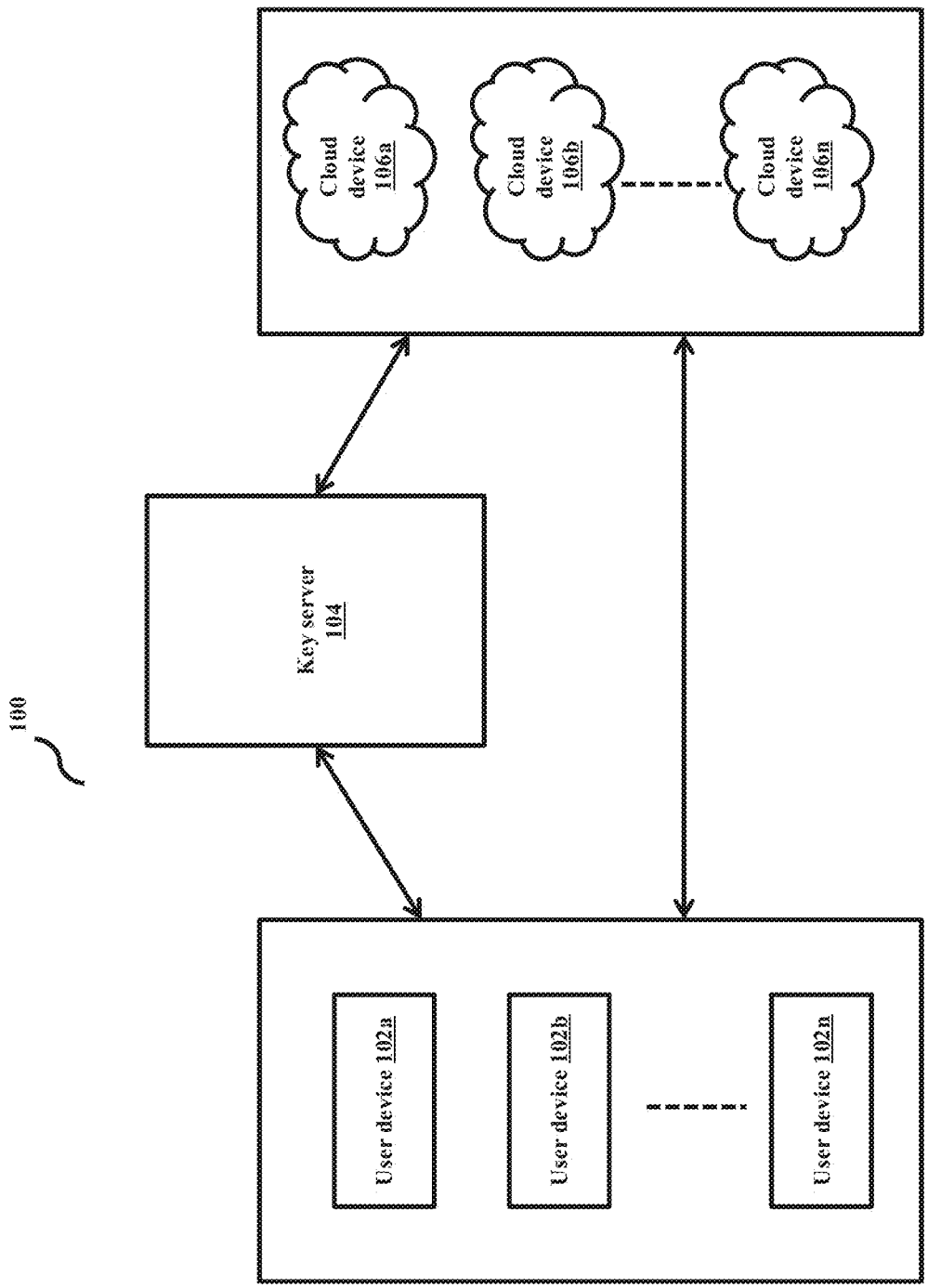
FIG. 1 depicts a cloud storage system, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for enabling at least one user device to upload encrypted data objects to at least one cloud device for sharing the encrypted data objects with other user devices.

Embodiments herein disclose methods and systems for enabling the at least one user device to share at least one encrypted data object uploaded in the at least one cloud device with at least one other user device through the key server such that the key server and the at least one cloud device do not obtain information about the shared at least one encrypted data object.

Embodiments herein disclose methods and systems for enabling the at least one user device to share the at least one encrypted data object uploaded in the at least one cloud device with the at least one other user device through the key server using Proxy Re-Encryption (PRE). The PRE does not involve bilinear paring operation and the PRE is a unidirectional single-use PRE. Embodiments herein disclose an interactive method to make use of the single use PRE for multiple hops, wherein the PRE offers control over the shared secure data.

The PRE is a cryptographic primitive, which uses a semi-trusted party namely the proxy/the key server to convert the encrypted data object/ciphertext meant for a first user device (of a first user/delegator/sender) to be decrypted by a second user device (of a second user delegate/receiver). In the PRE, the delegator $ID_i$/first user device (who delegates a decryption right) along with/without help of the delegatee $ID_j$/second user device (who accepts delegation)

generates re-encryption key ($rk_{i,j}$). The re-encryption key can be given to the key server so that the key server can transform the ciphertext ($ct_i$), that can further re-encrypt a message m (data object) encrypted using the public key $PK_i$ into a ciphertext $ct_j$ of the same message m under a different public key $PK_j$, without knowing the message m. In an embodiment, the re-encryption key can only be used to transform ciphertexts from $ID_i$ to $ID_j$. However, transforming of ciphertexts from $ID_j$ to $ID_i$ is not possible. In an embodiment, in the multi hop, the re-encrypted ciphertext can be further re-encrypted.

Referring now to the drawings, and more particularly to FIGS. 1 through 11c, where similar reference characters denote corresponding features consistently throughout the figures, there are shown at least one embodiment.

FIG. 1 depicts a cloud storage system 100, according to embodiments as disclosed herein. The cloud storage system 100 herein refers to a system wherein a plurality of data objects can be stored and securely shared between user devices with inherent access control. Examples of the cloud storage system 100 can be, but is not limited to, an email system, a social networking system, a content/file distribution system and so on. Examples of the data objects/content/data can be, but not limited to, files, content of files, text/messages, documents, media files (audio files, image files, video files or the like) and so on. In an embodiment, the cloud storage system 100 uses a Proxy Re-Encryption (PRE) for secure sharing of the data objects between the user devices. In an embodiment, the PRE can be a provably secure, unidirectional, pairing-free and single-use PRE method. In an embodiment, the PRE can support functions such as, but not limited to, a set up function, a key generation function, a re-encryption key (re-key) generation function, an encrypt function, a re-encrypt function, a decrypt function, a verify function and so on to perform transformations on the data objects.

The cloud storage system 100 includes a plurality of user devices 102a-102n, a key server 104, and a plurality of cloud devices/data centers 106a-106n.

The plurality of user devices 102a-102n referred herein can be electronic devices of users that can access services provided by the plurality of cloud devices/data centers 106a-106n and the key server 104 to share the data objects with each other. A user device of the plurality of user devices 102a-102n can be, but is not limited to, a mobile phone, a smartphone, tablet, a phablet, a personal digital assistant (PDA), a laptop, a computer, a wearable device, a smart watch, an IoT (Internet of Things) device, a wearable computing device, a vehicle infotainment system, a medical device, a camera, a Virtual Reality (VR) device, a vehicle display and so on. The plurality of user devices 102a-102n can communicate with the key server 104 and the at least one cloud device 106 using a communication network. Examples of the communication network can be, but is not limited to, the Internet, a wired network, a wireless network (a Wi-Fi network, a cellular network, Wi-Fi Hotspot, Bluetooth, Zigbee and so on) and so on. The plurality of user devices 102a-102n can subscribe with the key server 104 by creating an account for accessing services provided by the key server 104. The services can be at least one of storing re-encryption keys (re-keys), performing re-encryption/transformation of the data objects, providing the re-keys for decryption/transformation of the data objects and so on. The plurality of user devices 102a-102n can select at least one cloud device 106 based on service level agreement (SLA) for accessing cloud resources provided by the at least one cloud device 106a-106n for storing the data objects.

The plurality of user devices 102a-102n can include one or more processors, a memory, communication interface, a display, Input/Output (I/O) modules and so on (not shown). In an embodiment, the plurality of user devices 102a-102n can be configured to encrypt the data objects using the encrypt function of the PRE and upload the encrypted data objects to the at least one cloud device 106a-106n. The plurality of user devices 102a-102n can select the at least one cloud 106 from the plurality of cloud devices 106a-106n based on the SLA for uploading the encrypted data objects. Embodiments herein use the terms such as "ciphertext", "cipher", "encrypted data objects" and so on to refer to the data objects that are encrypted. In an embodiment, the plurality of user devices 102a-102n can select the encrypted data object(s) in the at least one cloud device 106a-106n and can download the selected encrypted data object(s) from the at least one cloud device 106a-106n. The plurality of user devices 102a-102n can decrypt the downloaded encrypted data objects to obtain the data object(s).

In an embodiment, at least one user device 102a of the plurality of user devices 102a-102n can share the encrypted data object(s) stored in the at least one cloud device 106a-106n with at least one other subscribed user device of the plurality of user devices 102b-102n through the key server 104. In an embodiment, the at least one user device 102a can share the encrypted data object(s) received from an owner of the encrypted data object(s) (for example: the user device 102b) with the at least one other user device 102c-102n through the key server 104 by taking permission from the owner of the encrypted data object(s)/the user device 102b.

The key server 104 referred herein can be a standalone server or a server on a cloud. Embodiments herein use the terms "proxy re-encryption server", "proxy re-encryption key server", "proxy", "semi-trusted party", "semi-trusted proxy" and so on to refer to the key server 104. Further, the key server 104 may be any kind of computing device such as those, but not limited to a personal computer, a notebook, a tablet, desktop computer, a laptop, a handheld device a mobile device, and so on. The key server 104 can include one or more processors, a memory, communication interface, Input/Output (I/O) modules and so on (not shown). In an embodiment, the key server 104 can be configured to share the encrypted data object(s) of the at least one user device 102a stored in the at least one cloud device 106a-106n with the at least one other user device 102b-102n using the PRE. The key server 104 re-encrypts the encrypted data object(s) of the at least one user device 102a and shares the re-encrypted encrypted data object(s) with the at least one other user device 102b-102n. The key server 104 can be further configured to pull/push the encrypted data object(s)/re-encrypted encrypted data object(s) from/to the at least one cloud device 106a-106n.

The plurality of cloud devices 106a-106n referred herein can be part of a public cloud or a private cloud. The plurality of cloud devices 106a-106n can be connected with the at least one user device 102a-102n and the key server 104 located in different geographical locations. The plurality of cloud devices 106a-106n can be operated by either same or different cloud service providers for providing cloud storage services to the plurality of user devices 102a-102n. The plurality of cloud devices 106a-106n can include one or more processors, a memory, a storage, a communication interface, Input/Output (I/O) modules and so on (not shown). In an embodiment, the plurality of cloud devices 106a-106n can store the encrypted data objects of the plurality of user devices 102a-102n by establishing the SLAs. In an embodiment, the plurality of cloud devices 106a-106n can store the re-encrypted data objects received from the key server 104, which are intended for the at least one user device of the plurality of user devices 102a-102n.

FIG. 1 show exemplary units of the cloud storage system 100, but it is to be understood that other embodiments are not limited thereon. In other embodiments, the cloud storage system 100 may include less or more number of units. Further, the labels or names of the units are used only for illustrative purpose and does not limit the scope of the embodiments herein. One or more units can be combined together to perform same or substantially similar function in the cloud storage system 100.

Figure 2:
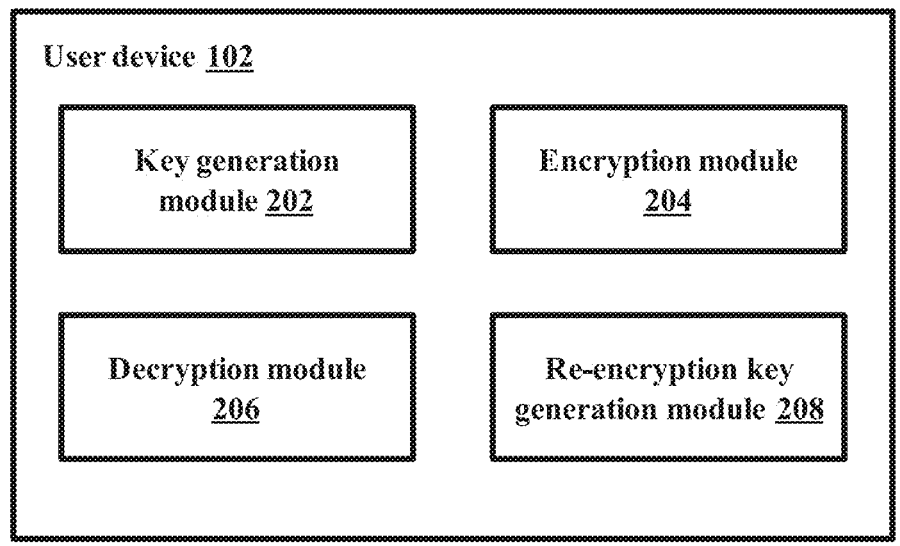
FIG. 2 is a block diagram illustrating various modules of a user device, according to embodiments as disclosed herein.

FIG. 2 is an example block diagram illustrating various modules of the user device 102a, according to embodiments as disclosed herein. Embodiments herein explained the various modules of the user device 102a, but it may be obvious to a person of ordinary skill in the art that at least one other user device 102b-102n may include similar modules and corresponding functionalities. The user device 102a includes a key generation module 202, an encryption module 204, a decryption module 206 ad a re-encryption key generation module 208.

The key generation module 202 can be configured to generate a private key and a public key corresponding to the user device 102a in a secure manner. In an embodiment, the key generation module 202 generates a random master secret key (MSK) at a time of registration/subscription with the key server 104. The random MSK may have high min-entropy. The key generation module 202 generates the MSK using, but not limited to, a cryptographically secure pseudo-random number generator (PRNG) or any other suitable methods/generators. The key generation module 202 further encrypts the MSK. For encrypting the MSK, the key generation module 202 derives a master secret key encryption key (MSKEK) from at least one of a password and a passphrase selected by the user of the user device 102a. The key generation module 202 can use at least one function such as, but is not limited to, a Password Based Key Derivation Function (PBKDF) or the like to derive the MSKEK. The key generation module 202 further uses the MSKEK to encrypt the MSK. The key generation module 202 shares the encrypted MSK with the key server 104 for storage.

In an embodiment, the key generation module 202 uses the MSK received from the key server 104 to generate the private key corresponding to the user device 102a. The private key can be used to obtain the data objects by decrypting at least one of the encrypted data objects and the re-encrypted encrypted data objects received from at least one of the key server 104 and the cloud device 106a-106n. The user device 102a does not share the private key with at least one of the key server 104 and the cloud devices 106a-106n. Thus, the at least one of the key server 104 and the cloud devices 106a-106n may not able to decrypt the encrypted data objects uploaded by the user device 102a.

In an embodiment, the key generation module 202 uses the key generation function of the PRE to derive the public key corresponding to the user device 102a. The user device 202 shares the public key with the key server 104. The public key corresponding to the user device 102a can be used by the at least one other user device 102b-102n for generating the re-key when the at least one other device 102a-102n wants to share the data objects with the user device 102a. In an example, the key generation module 202 executes the following steps of the key generation function (KeyGen (param)) of the PRE to obtain the public key $pk_i = \langle X_i, Y_i \rangle$:

choose $x_i, y_i \in_R Z^*_q$ (choose two numbers at random from the integer interval 1 to q−1); and compute $X_i = g^{x_i}$ and $Y_i = g^{y_i}$ (compute the exponentiation of the element g to the private key $x_i$ to obtain $X_i$ and the exponentiation of the element g to the private key $y_i$ to obtain $Y_i$), wherein the private key is $sk_i = \langle x_i, y_i \rangle$ and the element 'g' is a generator of a group G.

The encryption module 204 can be configured to encrypt the data objects when the user device 102 wants to upload the data objects to the at least one cloud device 106a-106n. For encrypting the data objects, the encryption module 204 derives a file encryption key (FEK) using the MSK received from the key server 104. The encryption module 204 derives the FEK using at least one function such as, but is not limited to, a Key Derivation Function (KDF) or the like. For example, the encryption module 204 derives the FEK using a 128-bit random salt with the MSK as a secret component in the KDF. The encryption module 204 encrypts the FEK with the public key corresponding to the user device 102a. The encryption module 204 then encrypts the data objects using the FEK and the encrypt function of the PRE. The encryption module 204 uploads the encrypted data objects along with the encrypted FEK to the at least one cloud device 106a-106n.

In an example herein, in order to generate an encrypted data object/ciphertext $C = \leq C_1, C_2, C_3, C_4, h \geq$ along with the encrypted FEK 'h' for the data object/message 'm', the encryption module 204 executes following steps involved in the encryption function (Encrypt(param, $PK_i$, m)) of the PRE:

choose $r, s \in_R Z^*_q$ (choose two numbers r and s at random from the integer interval 1 to q−1)

compute $h_i = H_i(X_i, Y_i)$ (compute the hash of the two elements $X_i$ and $Y_i$ using the hash function $H_1(.)$ to obtain $h_i$);

compute $C_1 = (X_i Y_i^{h_i})^r$ and $\overline{C_1} = (X_i Y_i^{h_i})^s$ (compute the exponentiation of $Y_i$ with $h_i$, compute the product of the result with $X_i$ and exponentiate the resulting element with r to obtain $C_1$. Compute the exponentiation of $Y_i$ with $h_i$, compute the product of the result with $X_i$ and exponentiate the resulting element with s to obtain $\overline{C_1}$.);

compute $C_2 = H_2(C_1, \overline{C_1})^r$ and $\overline{C_2} = H_2(C_1, \overline{C_1})^s$ (compute the hash of the two elements $C_1$ and $\overline{C_1}$ using the hash function $H_2(.)$ and exponentiate the resulting element with r to obtain $C_2$. Compute the hash of the two elements $C_1$ and $\overline{C_1}$ using the hash function $H_2(.)$ and exponentiate the resulting element with s to obtain $\overline{C_2}$);

compute $w = H_4(M, g^r)$ and $C_3 = (m \| w) \oplus H_3(g^r)$ (compute the hash of the message m/data object and the element $g^r$ using the hash function $H_4(.)$ to obtain w. Concatenate the message m with w and XOR the result with the hash output of the hash function $H_3(.)$ with $g^r$ as input.); and compute $h = H_5(C_1, \overline{C_1}, C_2, \overline{C_2}, C_3)$ and $C_4 = r + sh \bmod q$ (Compute the hash of the elements $C_1, \overline{C_1}, C_2, \overline{C_2}, C_3$ using the hash function $H_5$ to obtain h. Compute the product of s and h, add the result with r modulo q), wherein the ciphertext is $C = \langle C_1, C_2, C_3, C_4, h \rangle$, wherein (C1, C2, C3, C4) are components of the cipher text that encrypt the message m and 's', 'w' and 'r' are random elements chosen for generating the encrypted data/object.

The decryption module 206 can be configured to decrypt the encrypted data object(s) downloaded by the user device 102 from the at least one cloud device 106a-106n. The user device 102a can select the encrypted data object(s) from the at least one cloud 106a-106n and download the selected encrypted data object(s) and the associated encrypted FEK from the at least one cloud device 106a-106n. Thereafter, the decryption module 206 obtains the FEK by decrypting the encrypted FEK received from the at least one cloud device 106a-106n using the private key corresponding to the user device 102 and the decrypt function of the PRE.

In an example herein, in order to obtain the data object/message m' from the encrypted data object/ciphertext C=$\langle C_1, C_2, C_3, C_4, h \rangle$, the decryption module 206 executes the following steps involved in the decrypt function of the PRE (Decrypt (param, sk, C)):

check whether Verify(C)=True;
if the result is true, then the following steps can be executed:
compute $$\overline{w} = C_1^{(x_i + h y_i)^{-1}}$$

(Compute the inverse of $(x_i + h_{yi})$ modulo q and exponentiate the result with $C_1$ to obtain $\overline{w}$);

compute $(m'||w') = H_3(\overline{w}) \oplus C_3$ (Compute the hash value of $\overline{w}$ evaluated with the hash function $H_3(.)$ and XOR the output with $C_3$ to obtain m' concatenated with w');

if $w' = H_4(m', \overline{w})$ then output m' else output $\perp$ (check whether the hash of m' and $\overline{w}$ using the hash function $H_4(.)$ is same as w'. If they are same output m' as the message); and Else if the result is false, output $\perp$, wherein '$\perp$' represents an erroneous output that indicates to terminate the execution of the (above said) steps to obtain the data object.

In an example herein, the decryption module 206 executes the following steps of the verify function (Verify (C)) of the PRE to check the validity of the encrypted data object:

compute $$\overline{C_1} = \left(\frac{(X_i Y_i^{h_i})^{C_4}}{C_1}\right)^{h^{-1}} \text{ and } \overline{C_2} = \left(\frac{H_2(C_1, \overline{C_1})^{C_4}}{C_2}\right)^{h^{-1}};$$

check whether $h = H_5(C_1, \overline{C_1}, C_2, \overline{C_2}, C_3)$; and
return true if the above check holds, else return False.

In an embodiment, the decryption module 206 can be configured to decrypt the re-encrypted encrypted data object(s) of another device 102b received by the user device 102a from at least one of the key server 104 and the at least one cloud device 106a-106n. The decryption module 206 decrypts the re-encrypted encrypted data object(s) using the private key corresponding to the user device 102a and the decrypt function of the PRE. In an example herein, in order to obtain the data object m' from the re-encrypted encrypted data object/re-encrypted ciphertext D=$\langle D_1, D_2, D_3 \rangle$, the decryption module 206 executes the following steps of the decrypt function of the PRE:

compute $\overline{v} = H_1(D_2^{x_i}, D_2^{y_i})$ (Compute the hash of the two elements $D_2$ exponentiated with $x_i$ and $D_2$ exponentiated with $y_i$ using the hash function $H_1(.)$ to obtain $\overline{v}$), wherein $\overline{v}$ is an intermediate value;

compute $(m'||w') = H_3(D_1^{\overline{v}}) \oplus D_3$ (obtain the concatenation of m' and w' by computing the XOR of $D_3$ and the hash value of $D_1^{\overline{v}}$ evaluated with the hash function $H_3(.)$);

if $w' = H_4(m', \overline{w})$ then output m' else output $\perp$ (check whether the hash of m' and $\overline{w}$ using the hash function $H_3(.)$ is same as w'. If they are same output m' as the message); and Else if the result is False, output $\perp$.

In an example herein, the decryption module 206 further validates the data object/message m' obtained from the encrypted data object/ciphertext C=$\langle C_1, C_2, C_3, C_4, h \rangle$ and the re-encrypted encrypted data object D=$\langle D_1, D_2, D_3 \rangle$ if the ciphertext is a legitimate encryption of the message. In an example herein, the decryption module 206 executes the following steps of the verify function for validating the message:

Statement 1: $\overline{C_1} = \left(\frac{(X_i Y_i^{h_i})^{C_4}}{C_1}\right)^{h^{-1}} = (X_i Y_i^{h_i})^s$ $$LHS = \left(\frac{(X_i Y_i^{h_i})^{C_4}}{C_1}\right)^{h^{-1}}$$

$$LHS = \left(\frac{(X_i Y_i^{h_i})^{r+sh}}{(X_i Y_i^{h_i})^r}\right)^{h^{-1}},$$

since $C_1 = (X_i Y_i)^r$ and $C_4 = r + sh \mod q$ $$LHS = \left(\frac{(X_i Y_i^{h_i})^r (X_i Y_i^{h_i})^{sh}}{(X_i Y_i^{h_i})^r}\right)^{h^{-1}}$$

$$LHS = \left((X_i Y_i^{h_i})^{sh}\right)^{h^{-1}}$$

$LHS = (X_i Y_i^{h_i})^s = RHS$ as required

Statement 2: $\overline{C_2} = \left(\frac{H_2(C_1, \overline{C_1})^{C_4}}{C_2}\right)^{h^{-1}} = (H_2(C_1, \overline{C_1}))^s$ $$LHS = \left(\frac{H_2(C_1, \overline{C_1})^{C_4}}{C_2}\right)^{h^{-1}}$$

$$LHS = \left(\frac{H_2(C_1, \overline{C_1})^{r+sh}}{H_2(C_1, \overline{C_1})^r}\right)^{h^{-1}}$$

since $C_2 = H_2(C_1, \overline{C_1})^r$ and $C_4 = r + sh \mod q$ $$LHS = \left(\frac{H_2(C_1, \overline{C_1})^r H_2(C_1, \overline{C_1})^{sh}}{H_2(C_1, \overline{C_1})^r}\right)^{h^{-1}}$$

$$LHS = (H_2(C_1, \overline{C_1})^{sh})^{h^{-1}}$$

$LHS = H_2(C_1, \overline{C_1})^s = RHS$ as required.

In an example herein, $\overline{w} = C_1^{(x_i + h y_i)^{-1}} = g^r$ is considered to show that the decryption with the user device 102a secret key (the private key) retrieves the message, if the ciphertext is well formed.

$\overline{w} = C_1^{(x_i + h y_i)^{-1}} = g^r$   Statement 3:

$LHS = C_1^{(x_i + h y_i)^{-1}}$
$LHS = (X_i Y_i^{h_i})^{r)^{(x_i + h y_i)^{-1}}}$ since $C_1 = (X_i Y_i^{h_i})^r$
$LHS = g^{r(x_i + y_i h_i)(x_i + h y_i)^{-1}}$
$LHS = g^r = RHS$ as required.

The re-encryption key (re-key) generation module 208 can be configured to generate the re-key when the user device 102a wants to give permit for at least one other user device (for example: 102b) to decrypt its encrypted data objects. The re-key can be marked as the re-key from the user device 102a to the at least one other user device 102b. The re-key generated by the user device 102a can be used by the key server 104 to re-encrypt the encrypted data objects of the user device 102a.

For generating the re-key, the re-key generation module 208 obtains the encrypted MSK from the key server 104. The re-key generation module 208 derives the MSK by decrypting the encrypted MSK using the at least one of the password and the passphrase selected by the user of the user device 102a. Once the MSK is derived, the re-key generation module 208 derives the private key corresponding to the user device 102a. The re-key generation module 208 derives the private key using the MSK with at least one function such as the KDF or the like. Further, the re-key generation module 208 retrieves the public key of the at least one other user device 102b (with whom the user device wants to share the encrypted data object) from the key server 104. The re-key generation module 208 derives the re-key using the re-key generation function of the PRE, the private key corresponding to the user device 102a and the public key corresponding to the at least one other user device 102b.

In an example herein, in order to generate the re-key $rk_{i \to j} = \langle r_1, r_2 \rangle$ from the user device 102a (the user $ID_i$) to the at least one other user device 102b (the user $ID_j$), the re-key generation module 208 executes the following steps of the re-key generation function of the PRE:

choose $u \in_R Z^*_q$ (choose a number at random from the integer interval 1 to q−1);

compute $h_i = H_i(X_i, Y_i)$ and $v = \overline{H_1}(X_i^u, Y_i^u)$ (Compute the hash of the two elements $X_i$ and $Y_i$ using the hash function $H_1(.)$ to obtain $h_i$. Compute another hash of the two elements $X_i^u$ and $Y_i^u$ using the hash function $\overline{H_1}(.)$ to obtain v);

compute $$r_1 = \left[\frac{v}{x_i + h_i y_i}\right]$$

mod q (Compute $(x_i + h_i y_i)$ and multiply v by the inverse of the computed number modulo q to obtain $r_1$; and compute $r_2 = g^u$ (Compute the exponentiation of the element g to the random number u to obtain $r_2$), wherein the re-key $rk_{i \to j} = \langle r_1, r_2 \rangle$ FIG. 2 show exemplary units of the user device 102a, but it is to be understood that other embodiments are not limited thereon. In other embodiments, the user device 102a may include less or more number of units. Further, the labels or names of the units are used only for illustrative purpose and does not limit the scope of the embodiments herein. One or more units can be combined together to perform same or substantially similar function in the user device 102a.

Figure 3:
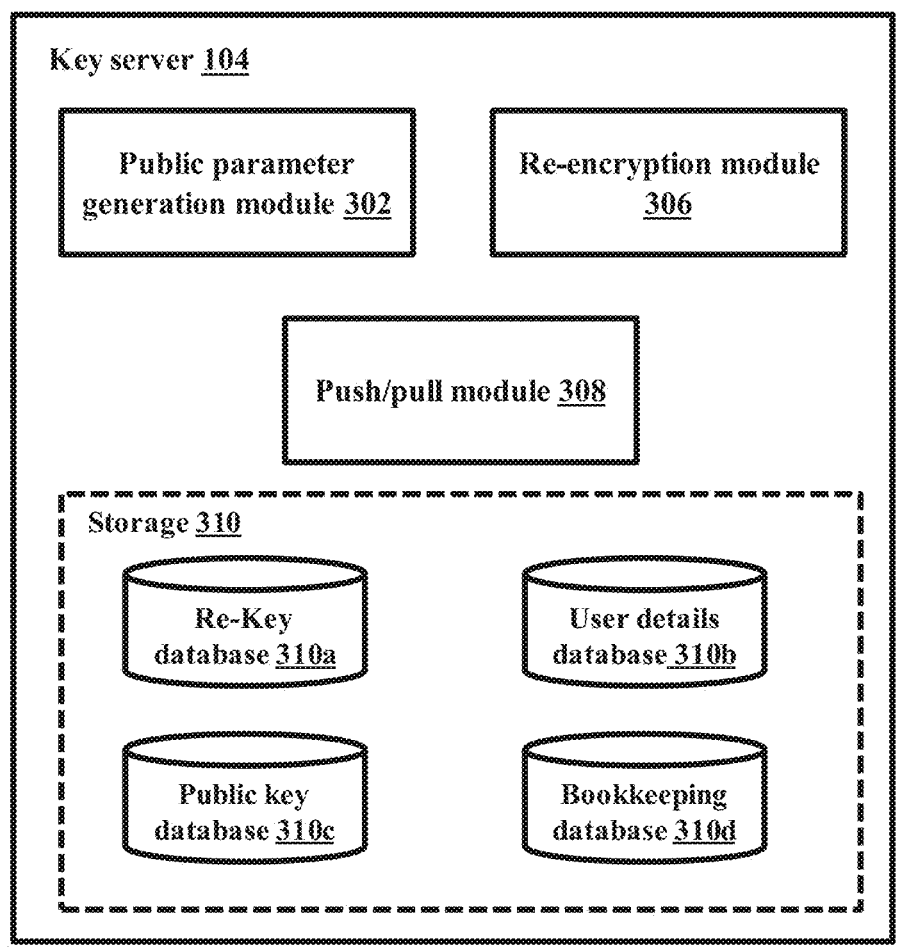
FIG. 3 is a block diagram illustrating various modules of a key server, according to embodiments as disclosed herein.

FIG. 3 is an example block diagram illustrating various modules of the key server 104, according to embodiments as disclosed herein. The key server 104 includes a public parameter generation module 302, a re-encryption module 306, a push/pull module 308 and storage 310.

The public parameter generation module 302 can be configured to generate public parameters for the plurality of user devices 102a-102n subscribed with the key server 104. The public parameter generation module 302 generates the public parameters using the setup function of the PRE.

In an example herein, in order to generate public parameters=<q, G, g, $H_1$, $H_2$, $H_3$, $H_4$, $H_5$, $H_6$>, the public parameter generation module 302 executes the following exemplary steps of the setup function (Setup(k)) of the PRE:

choose two primes p and q such that q|p−1 and bit length of q may be a security parameter k. Consider g may be a generator of a group G, which is a subgroup of $Z^*_q$ with order 'q'; and choose seven hash functions $H_1$: $G \times G \to Z^*_q$, $\overline{H_1}$: $G \times G \to Z^*_q$, $H_2$: $G \times G \to Z^*_q$, $H_3$: $G \to \{0, 1\}^{|m|} \times Z^*_q$, $H_4$: $\{0, 1\}^{|m|} \times G \to Z^*_q$, $H_5$: $G \times G \times G \times G \times \{0, 1\}^{|m|} \times Z^*_q \to Z^*_q$ and $H_6$: $\{0, 1\}^{|m|} \times Z^*_q$, wherein the public parameters are param=<q, G, g, $H_1$, $H_2$, $H_3$, $H_4$, $H_5$, $H_6$>.

The re-encryption module 304 can be configured to re-encrypt the encrypted data objects for sharing the encrypted data objects between the plurality of user devices 102a-102n. In an embodiment, the re-encryption module 304 re-encrypts a first-level encrypted data objects of the at least one user device (for example: the user device 102a) for sharing with the at least one other user device (for example: the user device 102b). The first-level encrypted data objects can be referred to the encrypted data objects uploaded by the at least one user device (for example: the user device 102a) to the at least one cloud device 106a-106n. The re-encryption module 304 retrieves the encrypted data object(s) selected by the user device 102a stored in the at least one cloud device 106a-106n to share with the user device 102b. The re-encryption module 304 re-encrypts the retrieved encrypted data object(s)/first-level encrypted data object(s) of the user device 102a. In an embodiment, the re-encryption module 304 re-encrypts the encrypted data object(s) of the user device 102a using the re-key generated by the user device 102a (the re-key from the user device 102a to the user device 102b) and the re-encryption function of the PRE.

In an example herein, in order to generate re-encrypted encrypted data object/re-encrypted ciphertext $D = \langle D_1, D_2, D_3 \rangle$, the re-encryption module 304 executes the following exemplary steps of the re-encryption function (ReEncrypt (param, $rk_{i \to j}$, $C_i$)):

check whether Verify ($C_i$)=True; and if the check returns True compute $D_1 = C_1^{r_1}$, $D_2 = r_2$ and $D_3 = C_3$ (here $D_1$ is the exponentiation of the element $C_1$ to the rekey element $r_1$), wherein the re-encrypted ciphertext is $D = \langle D_1, D_2, D_3 \rangle$.

In an embodiment, the re-encryption module 304 re-encrypts a second-level encrypted data objects of the at least one user device 102a for sharing with the at least one other user device (for example: the user device 102b). The second-level encrypted data objects refer to the re-encrypted data object(s) received by the at least one user device (for example: the user device 102a) from another user device (for example: the user device 102c). In an example herein, when the user device 102a wants to share the re-encrypted data object(s) of the user device 102c with the user device 102b, the re-encryption module 304 receives the re-key from the user device 102c, wherein the re-key is a re-key from the user device 102c to the user device 102b. The re-encryption module 304 re-encrypts the encrypted data objects of the user device 102c with the re-key (the re-key from the user device 102c to the user device 102b) received from the user device 102c. The re-encrypted data object(s) can be pushed to the at least one cloud device 106a-106n preferred/selected by the user device 102b. Thus, the user device 102b can download the re-encrypted data object from the selected at least one cloud device 106a-106n and decrypt the re-encrypted data object using the private key and the decrypt function of the PRE.

The push/pull module 306 can be configured to push the re-encrypted data objects of the plurality of user devices 102a-102n to the at least one cloud device 106a-106n. The push/pull module 306 can be further configured to pull the encrypted data objects of the plurality of user devices 102a-102n when the plurality of user devices 102a-102n wants to share the encrypted data objects with each other.

The storage 310 can store the public keys of the plurality of user devices 102a-102n, details of the users of the plurality of user devices 102a-102n, the re-keys of the plurality of user devices 102a-102n, data object sharing details and so on. The storage 310 can be at least one of, but not limited to, databases, memory and so on. In an example herein, the storage 310 can include separate databases such as a re-key database 310a to store the re-keys of the plurality of user devices 102a-102n, a user detail database to store the details of the users of the plurality of user devices 102a-102n, a public key database to store the public keys of the plurality of user devices 102a-102n, a bookkeeping database for storing the data object sharing details (bookkeeping purposes) and so on. Examples of the user details can be, but not limited to, user account details, subscription details, the at least one cloud device preferred by the user, information about the at least one cloud device 106a-106n in which the data objects of the plurality of user devices 102a-102n are stored and so on.

FIG. 3 show exemplary units of the key server 104, but it is to be understood that other embodiments are not limited thereon. In other embodiments, the key server 104 may include less or more number of units. Further, the labels or names of the units are used only for illustrative purpose and does not limit the scope of the embodiments herein. One or more units can be combined together to perform same or substantially similar function in the key server 104.

Figure 4:
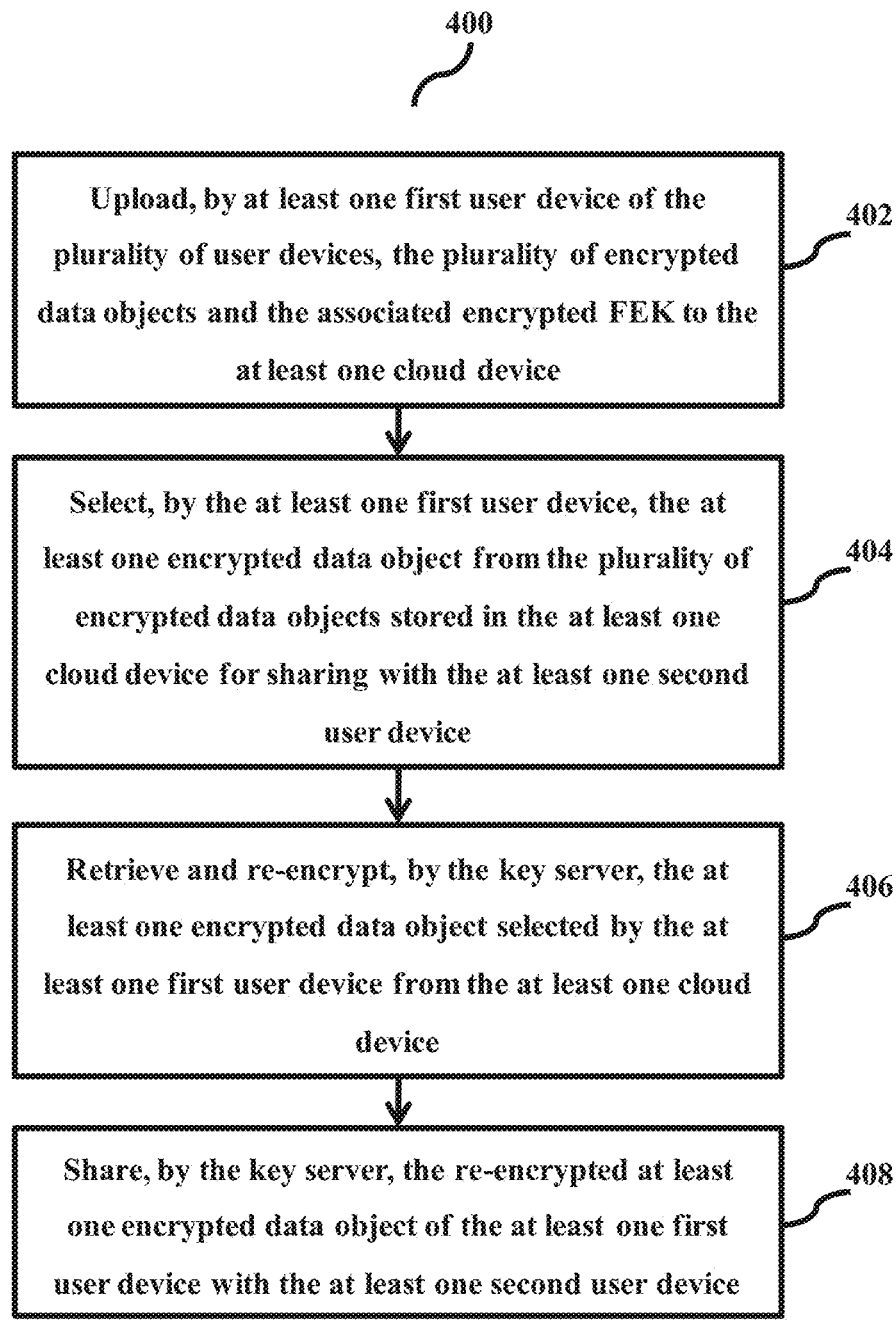
FIG. 4 is a flow diagram illustrating a method for secure sharing of data between user devices in a cloud storage system, according to embodiments as disclosed herein.

FIG. 4 is a flow diagram illustrating a method for secure sharing of the data objects between the plurality of user devices 102a-102n in the cloud storage system 100, according to embodiments as disclosed herein.

At step 402, the method includes uploading, by the at least one user device (for example: the user device 102a/first user device) of the plurality of user devices 102a-102n, the encrypted data objects and the associated encrypted FEK to the at least one cloud device 106a-106n. The user device 102a derives the FEK from the MSK. The user device 102a generates the MSK when the user device 102a subscribes/registers with the key server 104. The user device 102a further encrypts the data objects using the FEK and the encrypt function of the PRE. The user device 102a encrypts the FEK using the encrypt function of the PRE and the pubic key corresponding to the user device 102a. The user device 102a further uploads the encrypted data objects and associated encrypted FEK to the at least one cloud device 106a-106n.

At step 404, the method includes, selecting, by the user device 102a, the encrypted data object(s) stored in the at least one cloud device 106a-106n for sharing with the at least one other subscribed user present in the cloud storage system (for example: the user device 102b/second user device). The user device 102a further informs the key server 104 about the encrypted data object(s) stored in the cloud device 106a-106n that needs to be shared with the user device 102b.

At step 406, the method includes, retrieving and re-encrypting, by the key server 104, the encrypted data object(s) selected by the user device 102a from the at least one cloud device 106a-106n. On receiving information from the user device 102a about the selected encrypted data object(s), the key server 104 retrieves the selected encrypted data object(s) from the at least one cloud device 106a-106n. After retrieving the selected encrypted data object(s), the key server 104 re-encrypts the encrypted data object(s). For re-encrypting the encrypted data object(s) of the user device 102a, the key server 104 receives the re-key from the user device 102a (the re-key from the user device 102a to the user device 102b). The key server 104 re-encrypts the encrypted data object(s) selected by the user device 102a using the re-key generated at the user device 102a (the re-key from the user device 102a to the user device 102b) and the re-encrypt function of the PRE. Thus, the key server 104 re-encrypts the encrypted data object(s) of the user device 102a using the public key of the user device 102b that can be decrypted only using the private key of the user device 102b.

At step 408, the method includes, sharing, by the key server 104, the re-encrypted data object(s) of the user device 102a with the user device 102b. The user device 102b can obtain the data object(s) of the user device 102a by decrypting the re-encrypted encrypted data object(s) of the user device 102a received from the key server 104 using its private key and the decrypt function of the PRE. Thus, the data objects can be shared between the user devices without allowing the at least one cloud device 106a-106n and the key server 104 to learn about the shared encrypted data objects.

The various actions, acts, blocks, steps, or the like in the method and the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
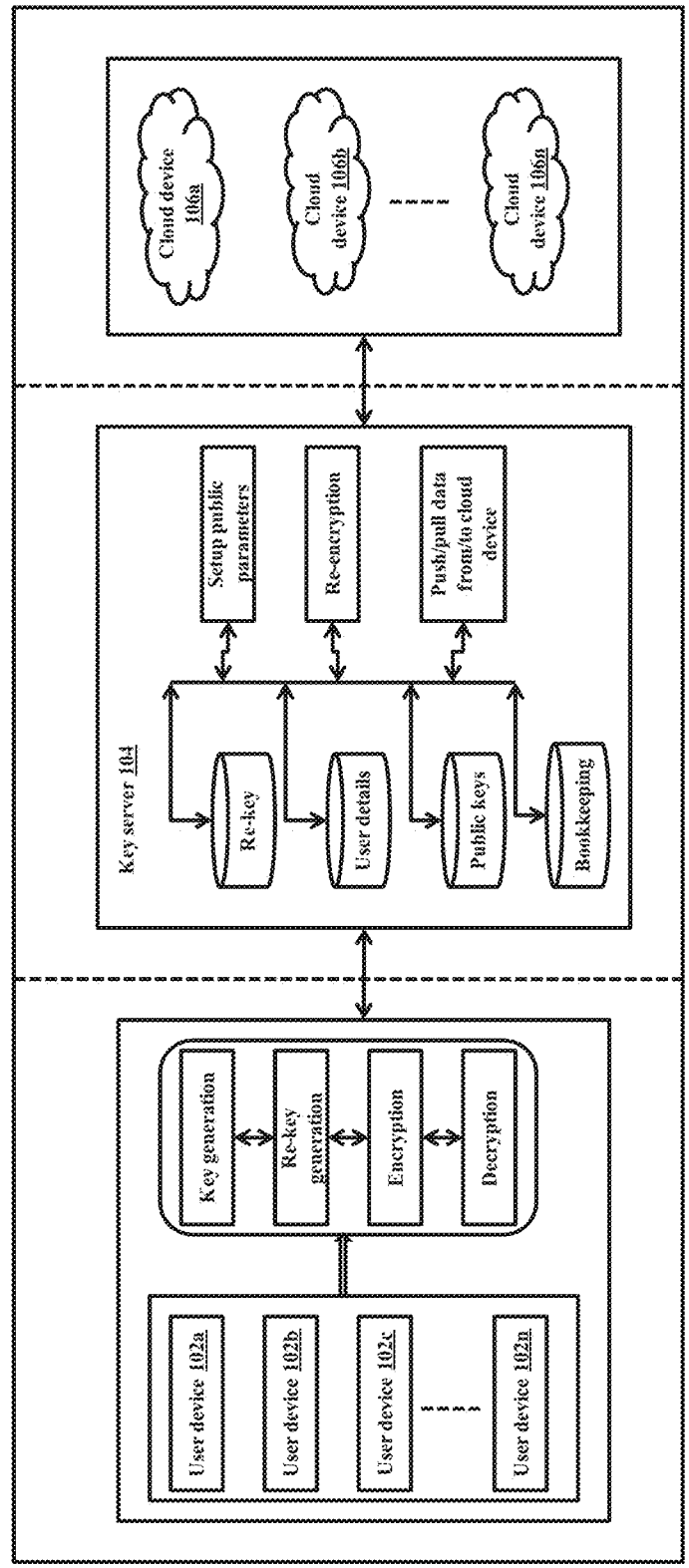
FIG. 5 depicts an cloud storage system for secure sharing of data between user devices, according to embodiments as disclosed herein.

FIG. 5 depicts an example architecture of the cloud storage system 100 for secure sharing of the data objects between the user devices, according to embodiments as disclosed herein. The cloud storage system 100 includes the plurality of user devices 102a-102n, the key server 104 and the plurality of cloud devices 106a-106n.

The plurality of user devices 102a-102n creates the account with the key server 104 and selects the at least one cloud device 106a-106n based on SLA to perform at least one function. The function can be at least one of, but not limited to, uploading the encrypted data objects to the at least one cloud device 106a-106n, downloading the encrypted data objects from the at least one cloud device 106a-106n and sharing the encrypted data objects stored in the at least one cloud device 106a-106n with each other through the key server 104. The plurality of user devices 102a-102n performs the at least one function using the functions of the PRE such as, but not limited to, the key generation function, the re-key generation function, the encrypt function, the decrypt function and so on.

The key server 104 acts as a secure key server. The key server 104 can be configured to support the user (the owner) of the at least one user device 102a to share the data with other subscribed user devices 102b-102n. The key server 104 further includes the databases to store information such as, but not limited to, the user details, the public keys, the re-encryption keys, and so on. The key server 104 can also maintain separate databases for bookkeeping purposes. The key server 104 uses the setup function of the PRE to generate the public parameters for the plurality of user devices 102a-102n. The key server 104 can also perform re-encryption using the valid re-keys corresponding to the at least one user device 102a whose encrypted data object is permitted to be shared with the other subscribed user devices 102b-102n. The key server 104 can be further configured to push/pull the re-encrypted encrypted data objects/encrypted data objects of the plurality of the user devices 102a-102n from the at least one cloud device 106a-106n.

The plurality of cloud devices 106a-106n offers a cloud storage application for the plurality of user devices 102a-102n. The plurality of cloud devices 106a-106n can store the encrypted data objects of the plurality of user devices 102a-102n based on a type of subscription/SLA that is made by the plurality of user devices 102a-102n with the plurality of cloud devices 106a-106n. In an example herein, the plurality of cloud devices 106a-106n does not perform any transformations on the stored encrypted data objects.

Figure 6:
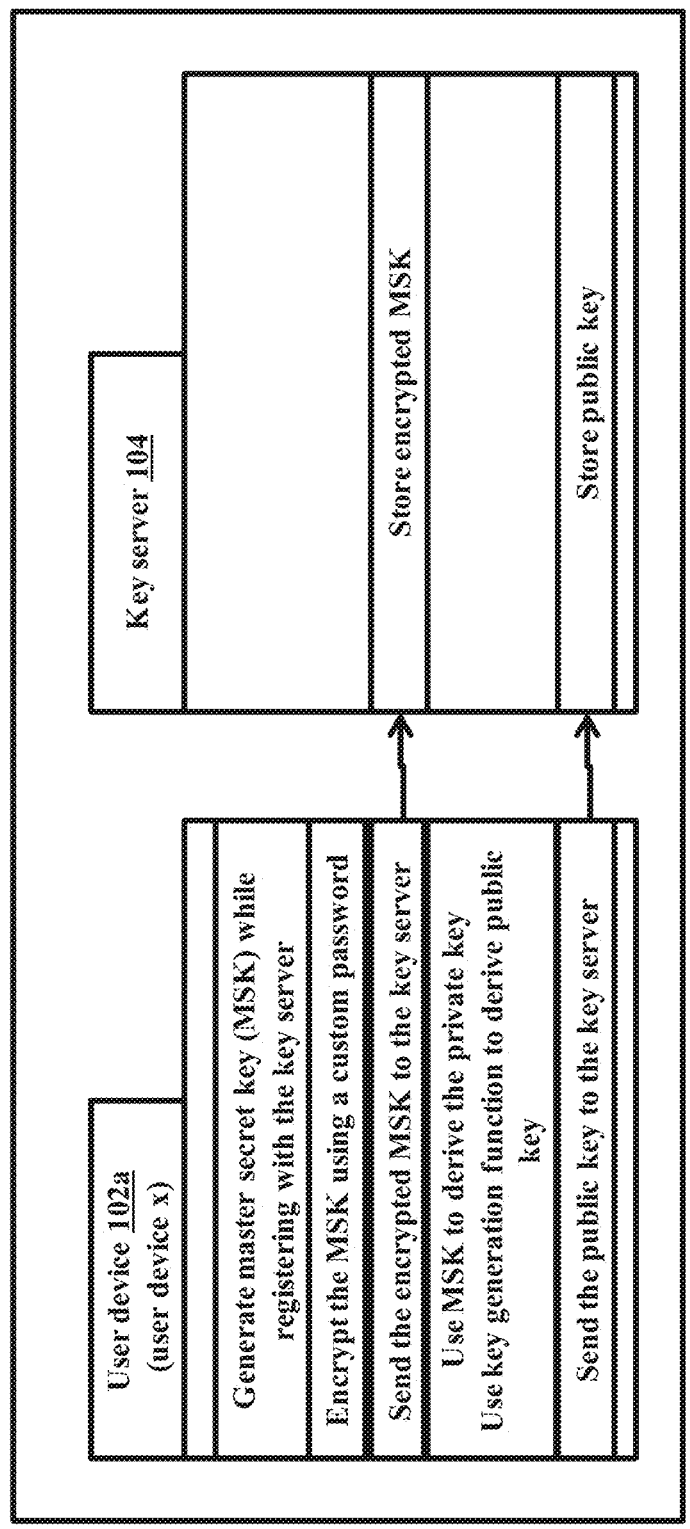
FIG. 6 is an example sequence diagram illustrating generation of a private key and a public key, according to embodiments as disclosed herein.

FIG. 6 is an example sequence diagram illustrating generation of the private key and the public key by the user device 102a, according to embodiments as disclosed herein. Embodiments herein further explained considering file(s) as the data object(s), but it may be obvious to a person of ordinary skill in the art that any other data objects can be considered.

The user device 102a generates the MSK while registering with the key server 104. The user device 102a encrypts the MSK using at least one of the custom password and the passphrase selected by the user of the user device 102a. The user device 102a sends the encrypted MSK to the key server 104. The key server 104 stores the encrypted MSK. In an embodiment, the user device 102a uses the MSK to generate the private key. Since the user device 102a does not share the private key with any other devices, the key server 104 and the plurality of cloud devices 106a-106n may not able to know the private key of the user device 102a. This further blocks the key server 104 and the plurality of cloud devices 106a-106n from decrypting the files uploaded by the user device 102a. In an embodiment, the user device 102a further uses the key generation function of the PRE to derive the public key and sends the public key to the key server 104 for storage.

Figure 7:
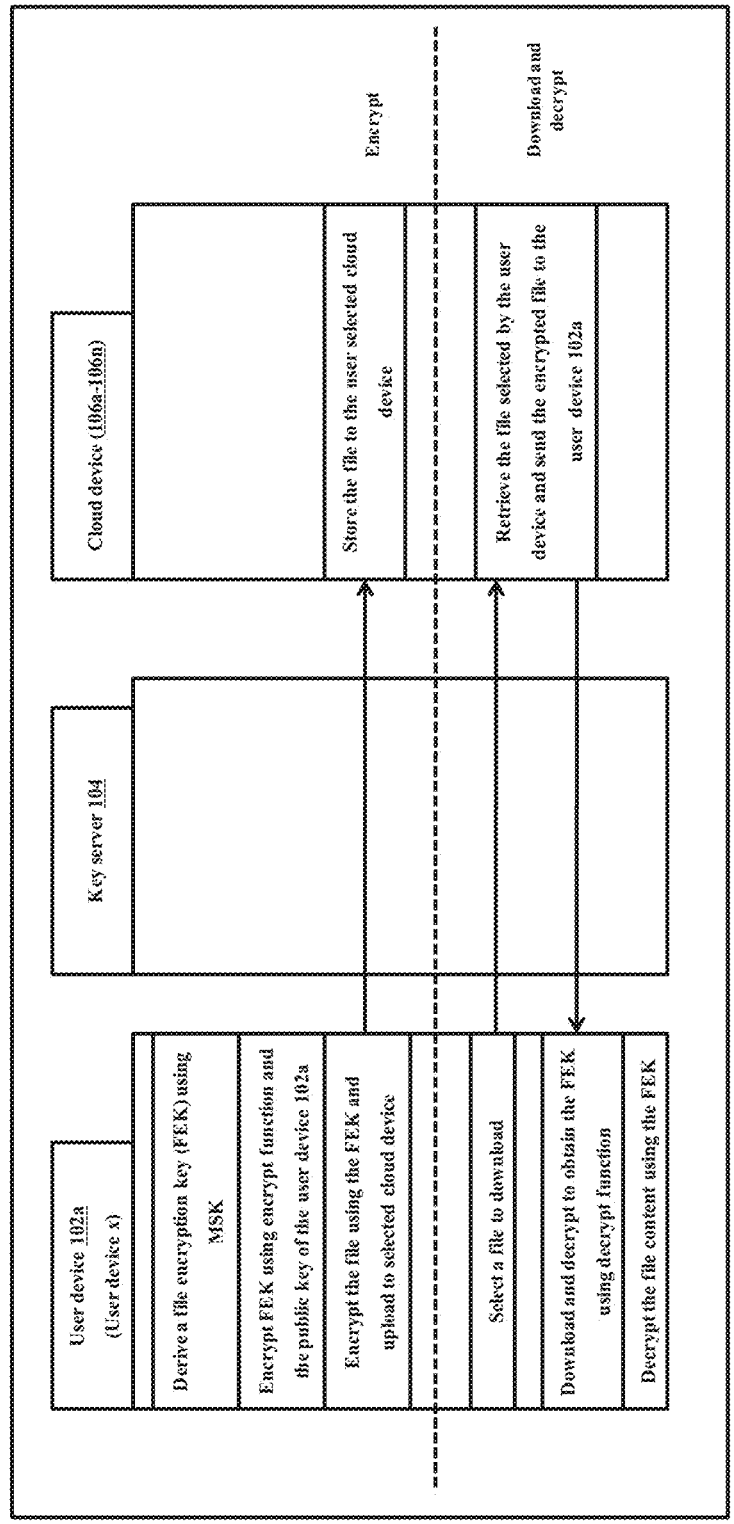
FIG. 7 is an example sequence diagram illustrating encryption and decryption performed by a user device, according to embodiments as disclosed herein.

FIG. 7 is an example sequence diagram illustrating encryption and decryption performed by the user device 104, according to embodiments as disclosed herein. Consider an example scenario, wherein the user of the user device 102a selects a file for uploading to the at least one cloud 106a-106n. In such scenario, the user device 104 drives the FEK using the MSK (generated at the time of registration with the key server 104). The user device 102a encrypts the FEK with the public key and the encrypt function of the FER. The user device 102a also encrypts the file selected by the user using the FEK and the encrypt function of the FER. The user device 102a further uploads the encrypted file along with the encrypted FEK to the selected at least one cloud device 106a-106n.

Consider an example scenario, wherein the user of the user device 102a selects the encrypted file stored in the at least one cloud device 106a-106n for downloading. In such scenario, the at least one cloud device 106a-106n retrieves the file selected by the user of the user device 102a and sends the corresponding encrypted file and the associated encrypted FEK to the user device 102a. The user device 102a downloads the encrypted file along with the encrypted FEK sent by the at least one cloud device 106a-106n and decrypts the encrypted FEK using the decrypt function of the PRE to obtain the FEK. The user device 102a derives the file by decrypting the encrypted file using the derived FEK.

Figure 8:
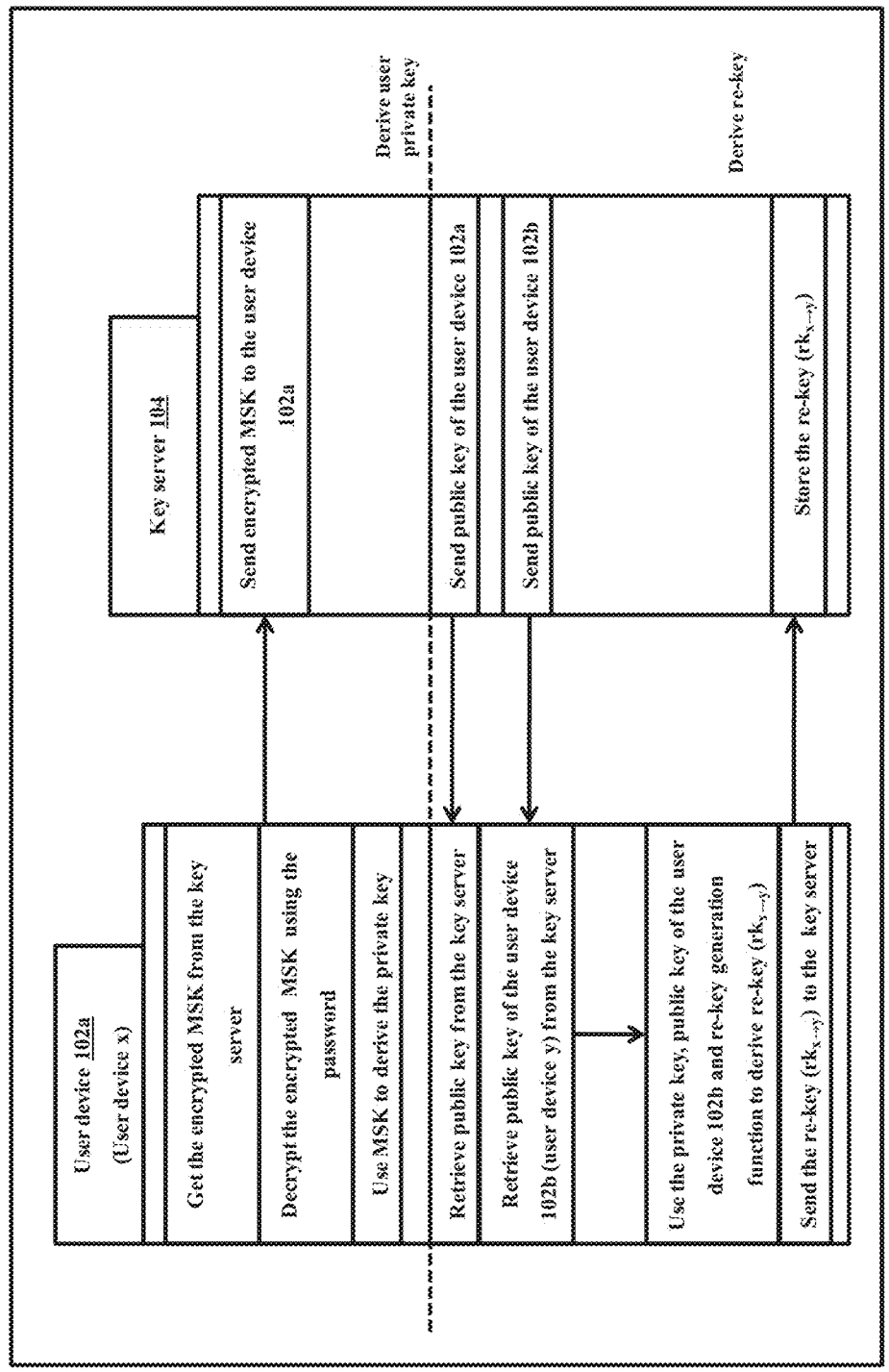
FIG. 8 is an example sequence diagram illustrating generation of re-encryption key (re-key), according to embodiments as disclosed herein.

FIG. 8 is an example sequence diagram illustrating generation of the re-key by the user device 102a, according to embodiments as disclosed herein. Consider an example scenario, wherein the user of the user device 102a (user device x) wants to share the file with another user of another user device 102b (user device y). In such scenario, the user device 102a derives the re-key ($rk_{x \to y}$) and shares the re-key with the key server 104 for sharing the file uploaded in the at least one cloud device 106a-106n with the user device 102b. For deriving the re-key, the user device 102a receives the encrypted MSK from the key server 104 and decrypts the encrypted MSK using the password selected by the user to obtain the MSK. The user device 102a further retrieves the public key of the user device 102b from the key server 104. The user device 102a uses its private key, the public key of the user device 102b and the re-encrypt function of the PRE to derive the re-key. The user device 102a sends the derived re-key to the key server 104. On receiving the re-key from the user device 102a, the key server 104a marks the re-key as the re-key from the user device 102a to the user device 102b and stores the re-key in the re-key database.

Figure 9:
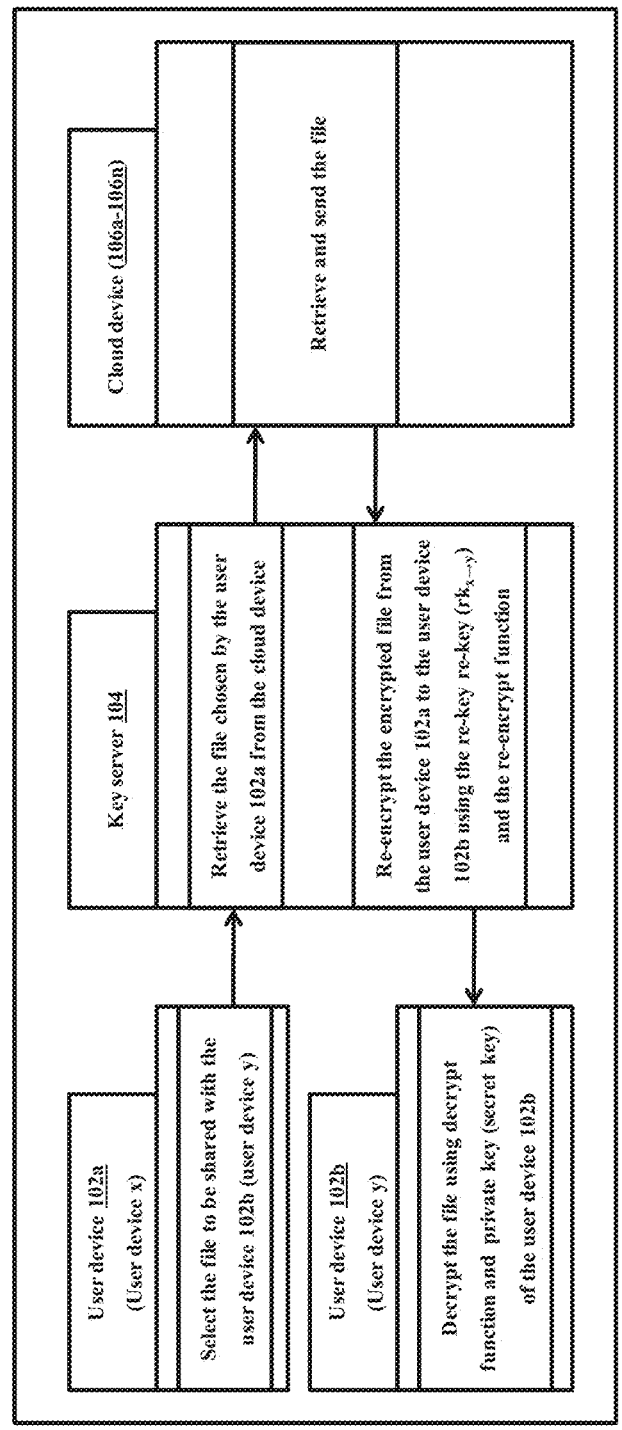
FIG. 9 is an example sequence diagram illustrating a sharing of first-level encrypted data, according to embodiments as disclosed herein.

FIG. 9 is an example sequence diagram illustrating the sharing of first-level encrypted data, according to embodiments as disclosed herein. Consider an example scenario, wherein the user of the user device 102a wants to share the encrypted file stored in the at least one cloud 106a-106n (the first-level encrypted data) with the user device 102b. In such scenario, the key server 104 pulls the encrypted file from the at least one cloud 106a-106n that is selected by the user of the user device 102a to share with the user device 102b. The key server 104 re-encrypts the encrypted file from the user device 102a to the user device 102b using the re-key ($rk_{x \to y}$) received from the user device 102a and the re-encrypt function of the PRE. The key server 104 shares the re-encrypted file of the user device 102a with the user device 102b. The user device 102b can decrypt the received re-encrypted file using the decrypt function of the PRE and its private key to obtain the file.

Figure 10:
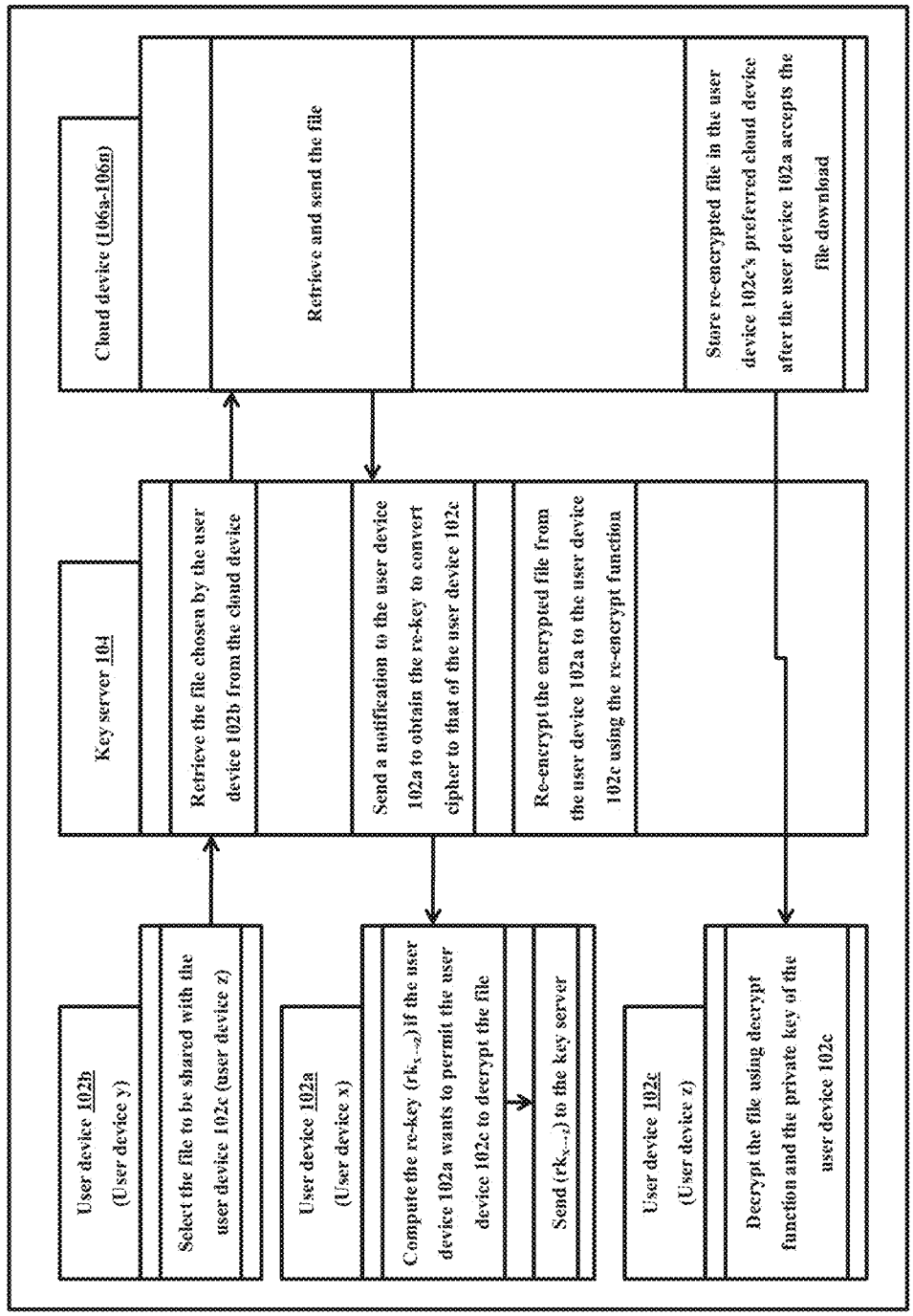
FIG. 10 is an example sequence diagram illustrating a sharing of second-level encrypted data, according to embodiments as disclosed herein.

FIG. 10 is an example sequence diagram illustrating the sharing of second-level encrypted data, according to embodiments as disclosed herein. Consider an example scenario, wherein the user of the user device 102b wants to share the file received from the user device 102a (the second-level encrypted data object) with a user of the user device 102c. In such scenario, the user device 102b wants to take permission from the user of the user device 102a to share the encrypted file with the user device 102c. The user device 102b informs the key server 104 to share the file with the user device 102c. The key server 104 retrieves the encrypted file of the user device 102a selected by the user of the user device 102b from the at least one cloud device 106a-106n. The key server 104 further sends the notification to the user device 102a to obtain the re-key to convert the encrypted file of the user device 102a to the user device 102c. If the user of the user device 102a wants to permit the user device 102c to decrypt the encrypted file, the user device 102a computes the re-key ($rk_{x \to z}$) using the re-key generation function of the PRE and the public key of the user device 102c. The user device 102a sends the re-key ($rk_{x \to z}$) to the key server 104. On receiving the re-key from the user device 102a, the key server 104a re-encrypts the encrypted file of the user device 102a using the re-key ($rk_{x \to z}$) and the re-encrypt function of the PRE. The key server 102a stores the re-encrypted file in the at least one cloud device 106a-106n preferred by the user device 102c. The user device 102c can download the re-encrypted file of the user device 102a from the at least one preferred cloud 106a-106n and decrypts the re-encrypted file using the decrypt function of the PRE and its private key to obtain the file. Thus, due to the usage of the PRE, even if the encrypted file is shared through the cloud device to the other user device, the encrypted file cannot be read by the key server and the cloud because the holder of the encrypted file has not received the re-encrypted file to decrypt it.

Figure 11A:
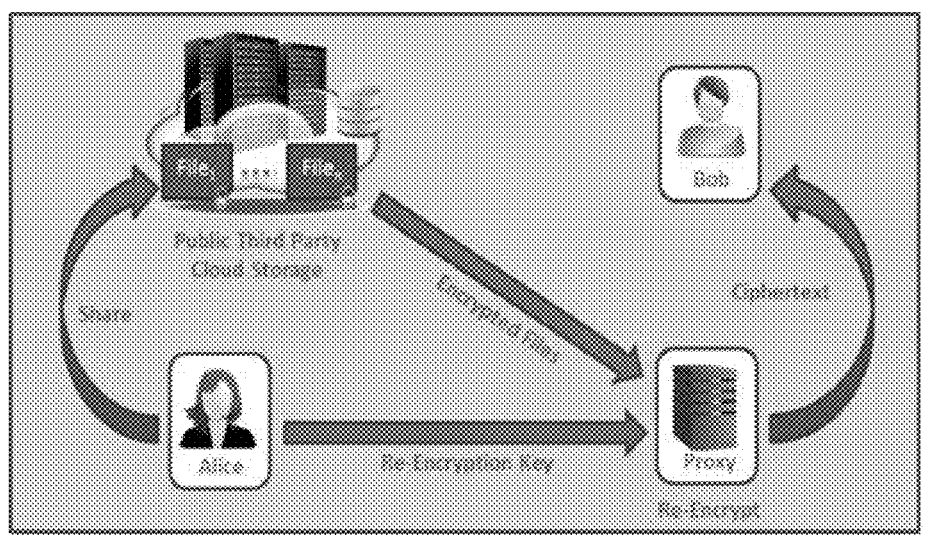
FIGS. 11a, 11b and 11c are example diagrams illustrating secure sharing of data stored in at least one cloud device between user devices, according to embodiments as disclosed herein.
Figure 11B:
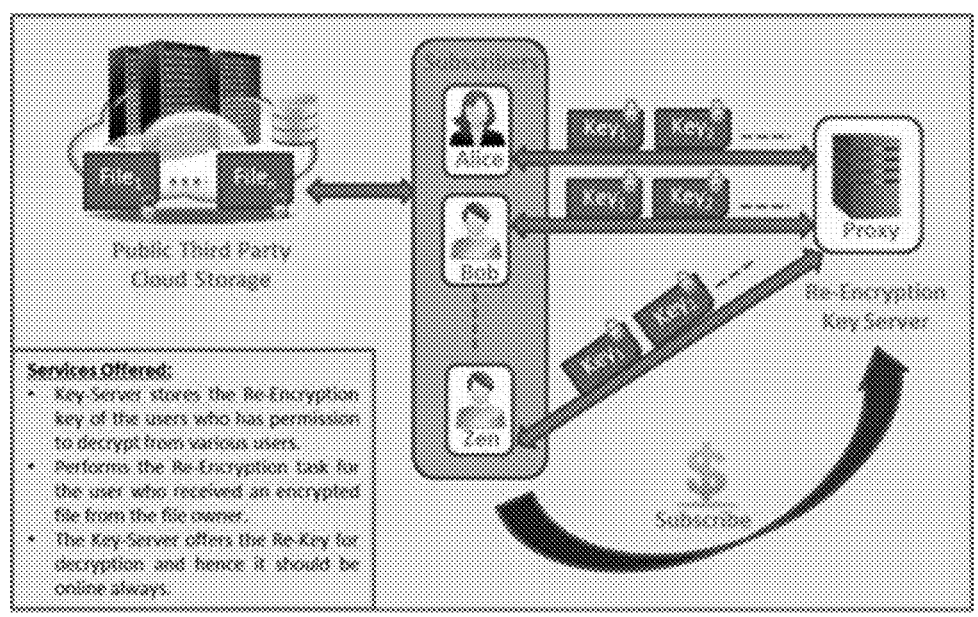
Figure 11C:
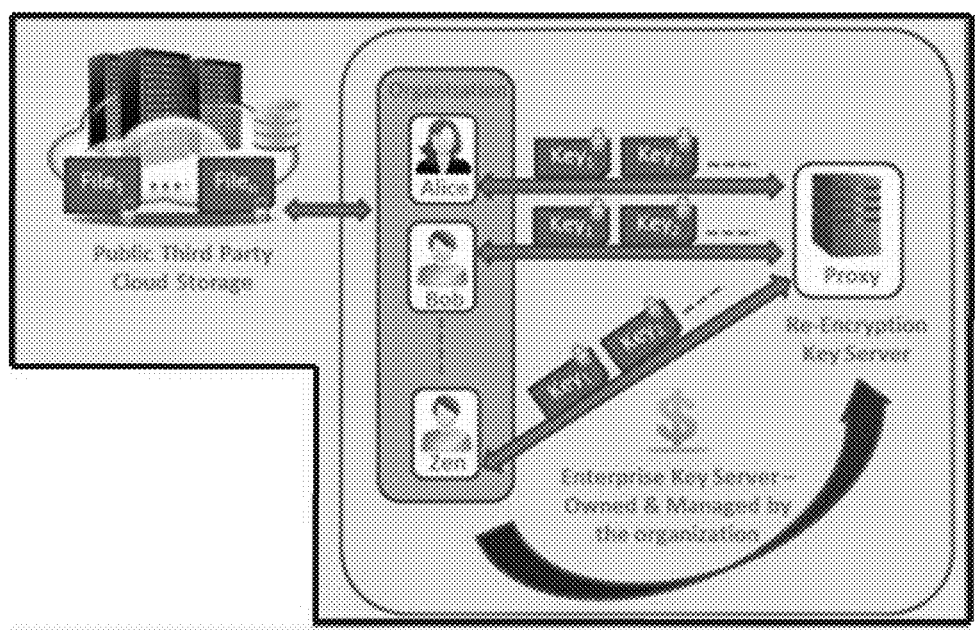

FIGS. 11a, 11b and 11c are example diagrams illustrating secure sharing of the data objects between the user devices 102a-102n in the cloud storage system 100, according to embodiments as disclosed herein.

Consider an example scenario as illustrated in FIG. 11a wherein Alice, a user of the user device 102a and Bob, a user of the user device 102b are subscribed users of the cloud storage system 100. Embodiments herein allow Alice to select the files to upload/share to the selected cloud device 106a-106n (third party cloud storage). Once Alice select the files, the user device 102a of Alice encrypts the file using the FEK and shares the encrypted file and the encrypted FEK with the selected cloud device 106a. Further, Alice may select the file(s) stored in the cloud 106a to share with Bob. Once Alice selects the file(s) stored in the cloud 106a, the user device 102a derives the re-key from Alice to Bob and shares the re-key with the key server 104. On receiving the re-key from the user device 102a, the key server 104 retrieves the encrypted file selected by Alice from the cloud 106a and re-encrypts the encrypted file using the re-key received from the user device 102a and the re-encrypt function of the PRE. The key server 104 further shares the re-encrypted encrypted file of Alice with the user device 102b (the user device of Bob). The user device 102b may decrypt the received encrypted file(s) of Alice using the decrypt function and its private key to obtain the file(s). Thus, the file(s) can be shared between Alice and Bob in the cloud storage system 100 without allowing the key server 104 and the cloud 106a-106n to decrypt the file.

In an exemplary embodiment, the cloud storage system 100 can be deployed as at least one of a Business to Commerce (B2C) model, a Business to Business (B2B) model or the like. Consider an example scenario as illustrated in FIG. 11b, wherein the cloud storage system 100 acts as the B2C model. In an example cloud storage system 100 acting as the B2C model, the users of the user devices 102a-102n who want to use the key server 104 are required to subscribe for the functionalities of the key server 104 and can obtain a key from the key server 104. The obtained key validates the users of the user devices 102a-102n are authenticated users. The subscription can be charged based on a number of re-encryptions performed by the key server 104. The key server 104 can be configured for storing the re-keys of the user devices 102a-102n who have permission to decrypt the files from the other user devices securely based on permissions. The key server 104 can also be configured for performing the re-encrypted functionality for the user device 102a who has received the encrypted file from the owner (the user device 102b) of the file. The key server 104 can be further configured for providing the re-keys for decryption and hence the re-keys can be online always.

Consider an example scenario as illustrated in FIG. 11c, wherein the cloud storage system 100 acts as the B2B model. In an example cloud storage system 100 acting as the B2B model, the users/end users of the user devices 102a-102n can be an organization, wherein the organization needs to encrypt the organizational data (the data object) and share among employees in a secure manner. The cloud storage system 100 enables such organization to host the organizational data in the cloud device 106a-106n using the PRE. The cloud storage system 100 acting as the B2B model can also enable the organization to share the already hosed data in the cloud device 106a-106n among the employees in a secure manner using the PRE.

In an example cloud storage system 100 acting as the B2B model, the users/end users of the user devices 102a-102n can also be the cloud service providers supporting the cloud devices 106a-106n. The cloud storage system 100 acting as the B2B model can allow the cloud service providers to enable the secure sharing of the data stored in the cloud devices 106a-106n using the PRE.

Embodiments herein provide a provable secure way for users registered with a proxy re-encryption key server to share contents stored in at least one cloud device to an intended receiver, in such a way that at least one of the cloud device and the proxy re-encryption key server may not able to obtain data stored in the cloud device.

Embodiments herein use a cryptographic primitive called proxy re-encryption (PRE) to achieve end-to-end confidentiality while sharing the data for collaborative development. The PRE can be a unidirectional, single-use, collusion-safe, pairing free and provable secure proxy re-encryption scheme. Embodiments herein use the PRE as an access control mechanism in a cloud storage system that allows file encryption and controlled file sharing. In an embodiment, the PRE provides end-to-end encryption with no known possible way to snoop in the stored data. In another embodiment, the PRE can be implemented using elliptic curves.

Further, secure sharing of the data stored in the cloud using the PRE enables an owner of the data object/file to have sole responsibility for providing and revoking access to the data object;

achieves secure sharing as straight forward with no overhead for the owner, wherein the owner need not be online while sharing a very huge content;

offers end-to-end security for the data while sharing the data;

achieves military grade security;

provides no way for the at least one cloud device to collide with at least one of the proxy re-encryption key server and the user to decrypt the data; and provides provable security for the encrypted data stored in the at least one cloud device.

The embodiments disclosed herein can be implemented through at least one software program running on at least one hardware device and performing network management functions to control the elements. The elements shown in FIG. 11c can be at least one of a hardware device, or a combination of hardware device and software module.

The embodiments disclosed herein describe methods and systems for secure sharing of cloud data between users using Proxy Re-Encryption Key (PRE). Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for secure sharing of data between user devices in a cloud storage system, the method comprising:
 sharing at least one encrypted data object of a plurality of encrypted data objects of at least one first user device of a plurality of user devices stored in at least one cloud device with at least one second user device of the plurality of user devices through a key server using a Proxy Re-Encryption (PRE);
 generating a master secret key (MSK) at a time of registration with the key server;
 using the generated MSK to derive a private key;
 using a key generation function of the PRE to derive a public key;
 deriving a master secret key encryption key (MSKEK) to encrypt the MSK using at least one of a password and a passphrase selected by a user of the at least one first user device;
 sharing the encrypted MSK and the public key with the key server for storage;
 obtaining and decrypting the encrypted MSK from the key server with at least one of the password and the passphrase selected by the user of the at least one first user device;
 deriving the private key corresponding to the at least one first user device using the decrypted MSK;
 retrieving a public key corresponding to the at least one second user device from the key server;
 deriving the re-key using the private key corresponding to the at least one first user device, the public key corresponding to the at least one second user device and a re-key generation function of the PRE; and
 sharing the re-key with the key server marking as a key from the at least one first user device to the at least one second user device for sharing the at least one encrypted data object stored in the at least one cloud device with the at least one first user device.

2. The method of claim 1, wherein the PRE is a unidirectional single-use PRE for multiple hops that controls the sharing of the at least one encrypted data object between the at least one first user device and the at least one second user device.

3. The method of claim 1, wherein sharing the at least one encrypted data object of the at least one first user device with the at least one second user device includes:
 uploading, by the at least one first user device, the plurality of encrypted data objects along with an encrypted file encryption key (FEK) to the at least one cloud device;
 selecting, by the at least one first user device, the at least one encrypted data object from the plurality of encrypted data objects stored in the at least one cloud device for sharing with the at least one second user device;
 retrieving and re-encrypting, by the key server, the at least one encrypted data object selected by the at least one first user device from the at least one cloud device; and
 sharing, by the key server, the re-encrypted at least one encrypted data object of the at least one first user device with the at least one second user device.

4. The method of claim 3, wherein uploading, by the at least one first user device, the plurality of encrypted data objects along with the encrypted FEK to the at least one cloud device includes:
 deriving a FEK using a Master Secret Key (MSK) generated at the time of registration with the key server;
 encrypting the FEK using a public key corresponding to the at least one first user device and an encrypt function of the PRE;
 encrypting a plurality of data objects using the FEK; and
 uploading the encrypted plurality of data objects along with the encrypted FEK to the at least one cloud device.

5. The method of claim 4, wherein, on uploading the plurality of encrypted data objects along with the encrypted FEK to the at least one cloud device, the method comprises:
 downloading the at least one encrypted data object along with the associated encrypted FEK from the at least one cloud device;
 decrypting the at least one encrypted FEK using a decrypt function of the PRE and the private key corresponding to the at least one first user device to obtain the FEK; and
 decrypting the at least one encrypted data object using the obtained FEK to derive the at least one data object.

6. The method of claim 3, wherein re-encrypting, by the key server, the at least one encrypted data object includes re-encrypting the at least one encrypted data object using a re-key from the at least one first user device to the at least one second user device and a re-encrypt function of the PRE.

7. The method of claim 3, further comprising decrypting, by the at least one second device, the re-encrypted data object of the at least one first user device using a private key corresponding to the at least one second user device and the decrypt function of the PRE.

8. The method of claim 3, further comprising:
 sending, by the key server, at least one notification to the at least one first user device to obtain a re-key from the at least one first user device to at least one third device when the at least one second user device wants to share the at least one encrypted data object of the at least one first user device with the at least one third device of the plurality of user devices;
 re-encrypting, by the key server, the at least one encrypted data object from the at least one first user device to the at least one third user device on receiving the re-key from the at least one first user device to at least one third device from the at least one first user device; and
 storing, by the key server, the re-encrypted encrypted data object of the at least one first user device in the at least one cloud device preferred by the at least one third user device, wherein the at least one third user device downloads the encrypted data object of the at least one first user device from the preferred at least one cloud device and decrypts the encrypted data object with the private key corresponding to the at least one third user device to obtain the at least one data object.

9. A cloud storage system comprising of a plurality of user devices, at least one cloud device and a key server, wherein the key server is to:
 share at least one encrypted data object of a plurality of encrypted data objects of at least one first user device of the plurality of user devices stored in the at least one cloud device with at least one second user device of the plurality of user devices using a Proxy Re-Encryption (PRE); and wherein the at least one first user device is to:
  generate a master secret key (MSK) at a time of registration with the key server;
  use the generated MSK to derive a private key;
  use a key generation function of the PRE to derive a public key;
  derive a master secret key encryption key (MSKEK) to encrypt the MSK using at least one of a password and a passphrase selected by a user of the at least one first user device;
  share the encrypted MSK and the public key with the key server for storage;
  obtain and decrypt the encrypted MSK from the key server with at least one of the password and the passphrase selected by the user of the at least one first user device;
  derive the private key corresponding to the at least one first user device using the decrypted MSK;
  retrieve a public key corresponding to the at least one second user device from the key server;
  derive the re-key using the private key corresponding to the at least one first user device, the public key corresponding to the at least one second user device and a re-key generation function of the PRE; and
  share the re-key with the key server marking as a key from the at least one first user device to the at least one second user device for sharing the at least one encrypted data object stored in the at least one cloud device with the at least one first user device.

10. The cloud storage system of claim 9, wherein the PRE does not involve a bilinear paring operation and the PRE is a unidirectional single-use PRE for multiple hops that controls the sharing of the at least one encrypted data object between the at least one first user device and the at least one second user device.

11. The cloud storage system of claim 9, wherein the at least one first user device is to:
  upload the plurality of encrypted data objects along with an encrypted file encryption key (FEK) to the at least one cloud device;
  select the at least one encrypted data object from the plurality of encrypted data objects stored in the at least one cloud device for sharing with the at least one second user device; and
  wherein the key server is to:
    retrieve and re-encrypt the at least one encrypted data object selected by the at least one first user device from the at least one cloud device; and
    share the re-encrypted at least one encrypted data object of the at least one first user device with the at least one second user device.

12. The cloud storage system of claim 11, wherein the at least one first user device is to:
  derive a FEK using a Master Secret Key (MSK) generated at the time of registration with the key server;
  encrypt the FEK using the public key corresponding to the at least one first user device and an encrypt function of the PRE;
  encrypt a plurality of data objects using the FEK; and
  upload the encrypted plurality of data objects along with the encrypted FEK to the at least one cloud device.

13. The cloud storage system of claim 12, wherein, on uploading the plurality of encrypted data objects along with the encrypted FEK to the at least one cloud device, the at least one first user device is to:
  download the at least one encrypted data object along with the associated encrypted FEK from the at least one cloud device;
  decrypt the at least one encrypted FEK using a decrypt function of the PRE and the private key corresponding to the at least one first user device to obtain the FEK; and
  decrypt the at least one encrypted data object using the obtained FEK to derive the at least one data object.

14. The cloud storage system of claim 11, wherein the key server is to re-encrypt the at least one encrypted data object using a re-key from the at least one first user device to the at least one second user device and a re-encrypt function of the PRE.

15. The cloud storage system of claim 11, wherein the at least one second user device is to decrypt the re-encrypted data object of the at least one first user device using a private key corresponding to the at least one second user device and the decrypt function of the PRE.

16. The cloud storage system of claim 11, wherein the key server is to:
  send at least one notification to the at least one first user device to obtain a re-key from the at least one first user device to at least one third device when the at least one second user device wants to share the at least one encrypted data object of the at least one first user device with the at least one third device of the plurality of user devices;
  re-encrypt the at least one encrypted data object from the at least one first user device to the at least one third user device on receiving the re-key from the at least one first user device to at least one third device from the at least one first user device; and
  store the re-encrypted encrypted data object of the at least one first user device in the at least one cloud device preferred by the at least one third user device, wherein the at least one third user device downloads the encrypted data object of the at least one first user device from the preferred at least one cloud device and decrypts the encrypted data object with the private key corresponding to the at least one third user device to obtain the at least one data object.

17. A user device of a cloud storage system comprising of a plurality of user devices, at least one cloud device and a key server, wherein the user device is to:
  upload a plurality of encrypted data objects and an associated encrypted file encryption key (FEK) to the at least one cloud device;
  share at least one encrypted data objects of the plurality of encrypted data objects of the user device stored in the at least one cloud device with at least one other user device of the plurality of user devices through the key server using a Proxy-Re-Encryption (PRE);
  generate a master secret key (MSK) at a time of registration with the key server;
  use the generated MSK to derive a private key;
  use a key generation function of the PRE to derive a public key;
  derive a master secret key encryption key (MSKEK) to encrypt the MSK using at least one of a password and a passphrase selected by a user of the user device; and
  share the encrypted MSK and the public key with the key server for storage;
  obtain and decrypt the encrypted MSK from the key server with at least one of the password and the passphrase selected by the user of the user device;

derive the private key corresponding to the user device using the decrypted MSK;

retrieve a public key corresponding to the at least one other user device from the key server;

derive the re-key using the private key corresponding to the user device, the public key corresponding to the at least one other user device and a re-key generation function of the PRE;

share the re-key with the key server marking as a key from the user device to the at least one other user device for sharing the at least one encrypted data object stored in the at least one cloud device with the user device; and share at least one re-encrypted data of the user with the at least one other user device through the key server using the PRE.

18. The user device of claim 17 wherein the user device further comprises:

an encryption module to:
   derive a FEK using the MSK generated at the time of registration with the key server;
   encrypt the FEK using the public key and an encrypt function of the PRE;
   encrypt a plurality of data objects using the FEK for uploading the encrypted plurality of data objects along with the encrypted FEK to the at least one cloud device;

a decryption module to:
   decrypt the at least one encrypted FEK using a decrypt function of the PRE and the private key corresponding to the user device to obtain the FEK on downloading the at least one encrypted data object and the associated FEK from the at least one cloud device; and
   decrypt the at least one encrypted data object using the obtained FEK to derive at least one data object.

* * * * *